(12) United States Patent
Cai

(10) Patent No.: US 12,478,204 B2
(45) Date of Patent: Nov. 25, 2025

(54) CHRISTMAS TREE WITH BUILT-IN INTELLIGENT LIGHT CONTROL CIRCUIT TECHNOLOGICAL RGB LIGHTS

(71) Applicants: Winner Industry Company Limited, Dongguan (CN); Winners Group Industries Company Limited, Industrial Park (CN)

(72) Inventor: Junhao Cai, Dongguan (CN)

(73) Assignees: Winner Industry Company Limited, Dongguan (CN); Winners Group Industies Company Limited, Industrial Park (CN)

( * ) Notice: Subject to any disclaimer, the term of this patent is extended or adjusted under 35 U.S.C. 154(b) by 0 days.

(21) Appl. No.: 18/627,884

(22) Filed: Apr. 5, 2024

(65) Prior Publication Data

US 2025/0311872 A1    Oct. 9, 2025

(30) Foreign Application Priority Data

Feb. 7, 2023   (CN) .......................... 202310069712.8

(51) Int. Cl.
- *A47G 33/06* (2006.01)
- *F21V 23/00* (2015.01)
- *F21V 23/04* (2006.01)
- *F21W 121/04* (2006.01)
- *H05B 47/12* (2020.01)

(52) U.S. Cl.
CPC ............ *A47G 33/06* (2013.01); *F21V 23/003* (2013.01); *F21V 23/0407* (2013.01); *H05B 47/12* (2020.01); *F21W 2121/04* (2013.01)

(58) Field of Classification Search
CPC ...... A47G 33/06; H05B 47/12; F21V 23/003; F21V 23/0407; F21W 2121/04

USPC ......................................................... 362/123
See application file for complete search history.

(56) References Cited

U.S. PATENT DOCUMENTS

| 2005/0052883 A1* | 3/2005 | Qi .............................. F21V 9/40 362/555 |
| 2006/0124819 A1* | 6/2006 | Wang ...................... A47G 33/06 248/404 |
| 2022/0202225 A1* | 6/2022 | In ............................. A61L 9/035 |

FOREIGN PATENT DOCUMENTS

| CN | 205338535 U | 6/2016 | |
| CN | 112261767 A * | 1/2021 | ............. H05B 47/12 |
| CN | 217959611 U | 12/2022 | |
| EP | 2361028 B1 * | 11/2014 | ............. A47G 33/06 |

OTHER PUBLICATIONS

Search translation of CN 112261767A (Year: 2025).*

* cited by examiner

*Primary Examiner* — Laura K Tso
(74) *Attorney, Agent, or Firm* — MUNCY, GEISSLER, OLDS & LOWE, P.C.

(57) ABSTRACT

The Christmas tree with built-in intelligent light control circuit technological RGB lights includes a bearing base, a trunk and an intelligent control unit, wherein the bearing base includes a support ring, and receiving slots are provided on a top of the supporting ring uniformly and vertically. Also, a plurality of first slots are provided on the top of the supporting ring uniformly. The trunk may be stably erected on the ground through a support by the bearing base. This application drives racks up or down through a first electric telescopic rod, and then drives limbs to rotate downward or upward and adjusts angles of limbs.

10 Claims, 6 Drawing Sheets

CHRISTMAS TREE WITH BUILT-IN INTELLIGENT LIGHT CONTROL CIRCUIT TECHNOLOGICAL RGB LIGHTS

CROSS-REFERENCE TO RELATED APPLICATION

This application claims priority to Chinese Patent Application No. 202310069712.8 filed on Feb. 7, 2023, the entire content of which is hereby incorporated by reference.

FIELD OF TECHNOLOGY

The present application relates to the technical field of Christmas trees, and in particular to a Christmas tree with built-in intelligent light control circuit technological RGB lights. Angles of limbs and branches of the Christmas tree with built-in intelligent light control circuit technological RGB lights are adjustable.

BACKGROUND

Christmas tree is an evergreen tree such as a fir tree or a pine decorated with lights. Christmas tree is one of the most important elements of Christmas. An evergreen plant is usually brought into the house or outdoors before Christmas and decorated with colored lights or colored ribbons hung on the branches.

In prior art, to protect environment or for other purposes, people produce artificial Christmas trees by stimulating natural Christmas trees to replace natural Christmas trees. For example, existing Christmas trees in shopping malls are integrated artificial Christmas trees. In the process of decorating Christmas trees, for the lower place of Christmas trees, people may stand directly on the ground to decorate, and for the higher place of Christmas trees, it is necessary to lift people to a certain height with the help of tools to decorate the Christmas trees.

However, for this kind of integrated artificial Christmas tree, people need to use some special tools such as ladders and the like to decorate a top of a Christmas tree. Due to the influence of the placement position of the ladder and the standing space, it is difficult to adjust each decoration to the desired angle. Meanwhile, after Christmas, the Christmas trees need to be moved into the warehouse for storage. Since the existing Christmas trees are integrated, they occupy a large space and are not conducive to storage.

SUMMARY

According to an aspect of this disclosure, a Christmas tree with built-in intelligent light control circuit technological RGB lights is disclosed.

The Christmas tree with built-in intelligent light control circuit technological RGB lights, includes,
 a bearing base that includes a supporting ring, wherein receiving slots are provided on a top of the supporting ring vertically, and a plurality of first slots are provided on the top of the supporting ring;
 a trunk that includes a sleeve provided in the supporting ring, wherein the sleeve is a hollow structure, a plurality of through holes are provided on a lower part of an outer wall of the sleeve horizontally, a first limiting rod is provided in each of the through holes, one end of the first limiting rod extends out of the sleeve, a first electric telescopic rod is provided inside the sleeve, and a bottom end of the first electric telescopic rod is fixedly connected to a bottom of an inner wall of the sleeve;
 a plurality of limbs provided around the sleeve, both ends of each of the limbs are hollow structures which are a receiving space and an accommodating space respectively; and
 an intelligent control unit that includes a power supply, a light control assembly electrically connected to the power supply, a master control assembly electrically connected to the light control assembly, and a plurality of ambient lights electrically connected to the power supply and the master control assembly;
 wherein, the intelligent control unit further includes a music playing unit electrically connected to the master control assembly and a music capture unit electrically connected to the master control assembly, the music playing unit is used for playing music, and the music capture unit is used for capturing and analyzing a music played by the music playing unit to obtain a rhythm degree of the music played by the music playing unit, and the master control assembly sends a rhythm instruction to the light control assembly according to the rhythm degree, and the light control assembly generates and sends a corresponding rhythm signal to the ambient lights according to the rhythm instruction, and the ambient lights shift according to the rhythm signal.

BRIEF DESCRIPTION

Figure 1:
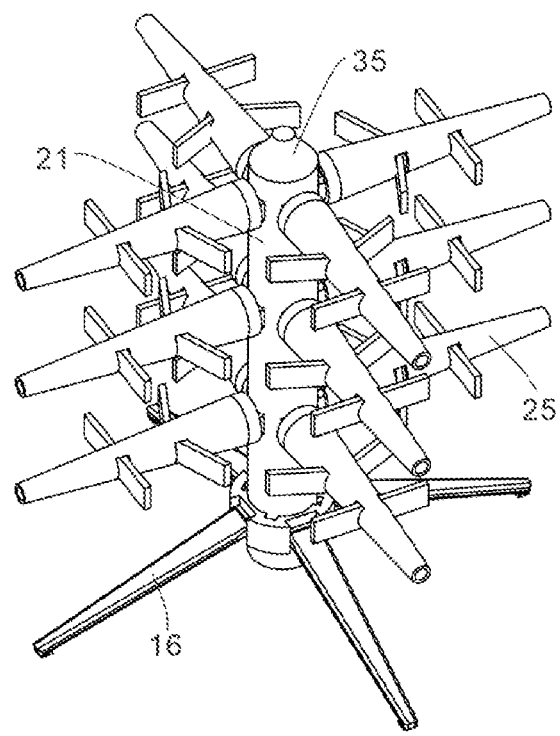
FIG. 1 is a schematic diagram of an overall structure of a Christmas tree of the present application.
Figure 2:
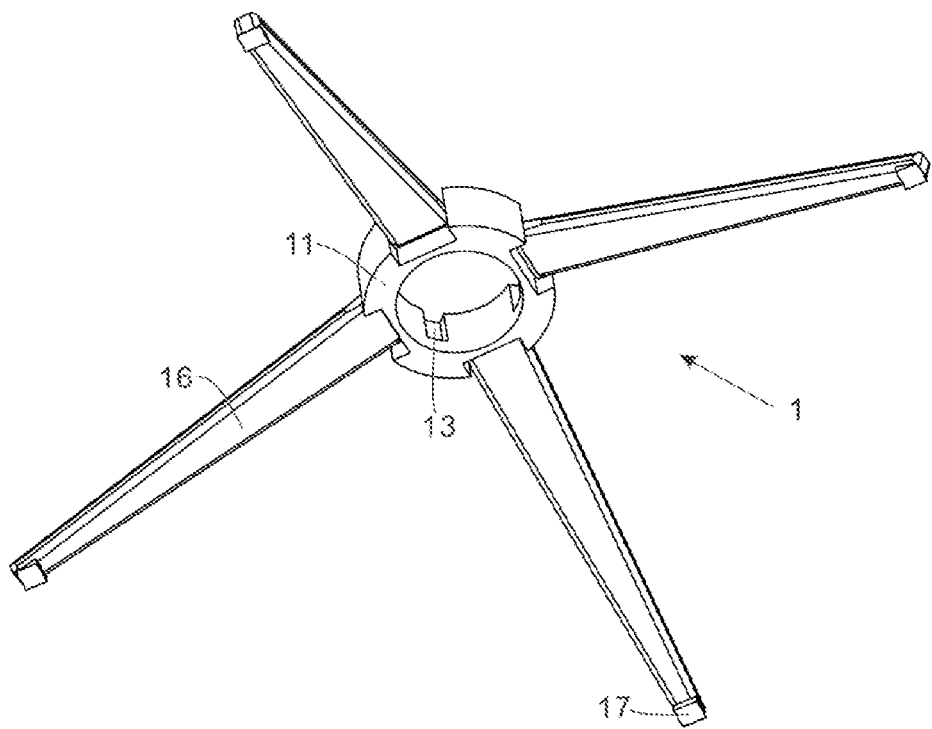
FIG. 2 is a schematic structural diagram of a bearing base of the present application.
Figure 3:
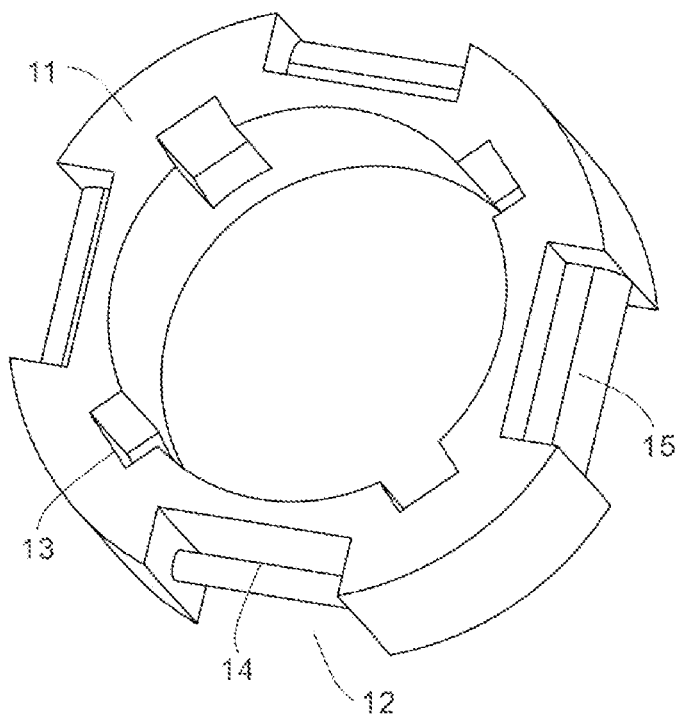
FIG. 3 is a schematic structural diagram of a supporting ring of the present application.
Figure 4:
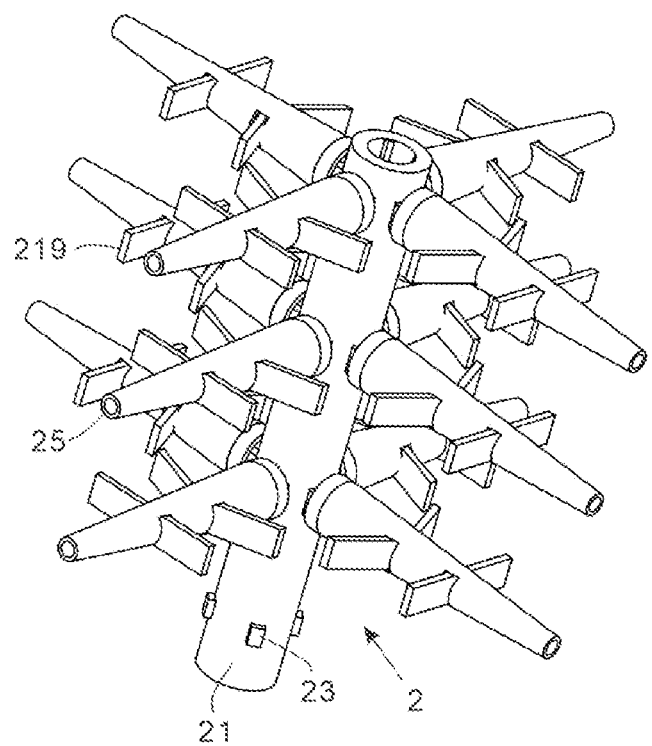
FIG. 4 is a schematic structural diagram of a trunk of the present application.
Figure 5:
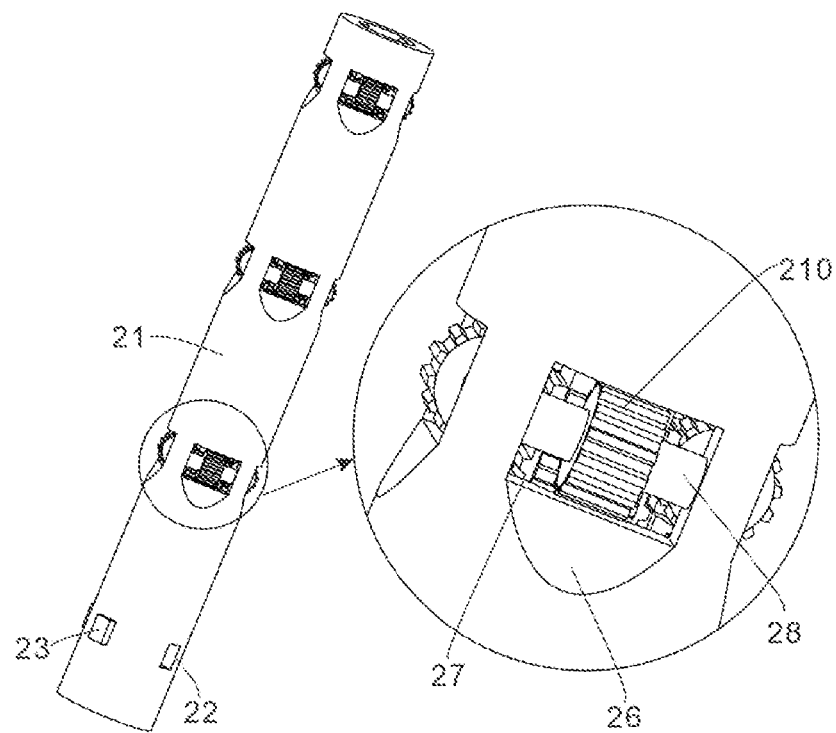
FIG. 5 is a schematic structural diagram of a sleeve of the present application.
Figure 6:
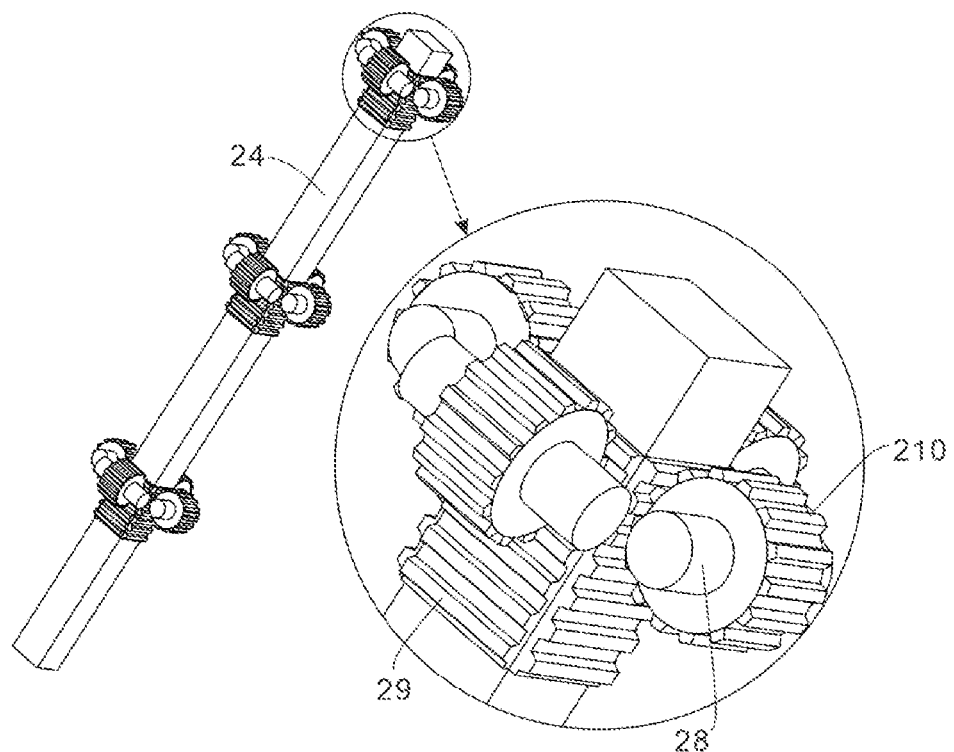
FIG. 6 is a schematic structural diagram of racks of the present application.
Figure 7:
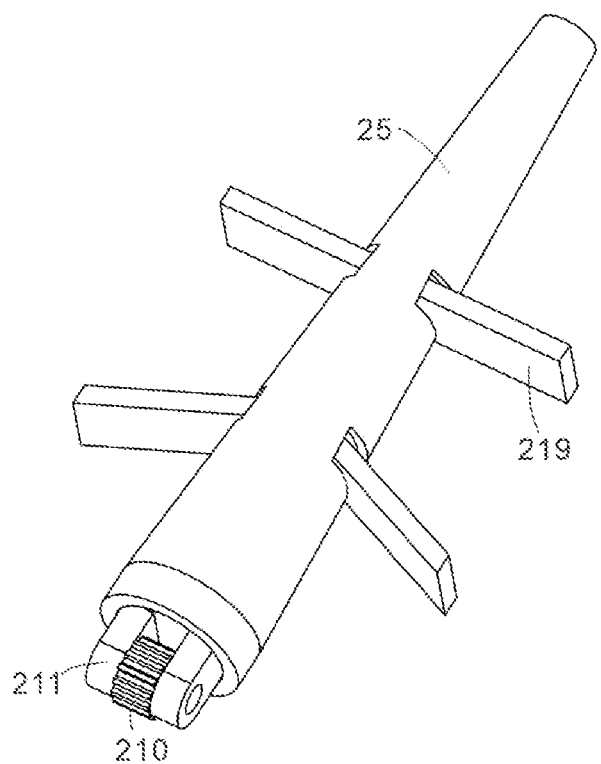
FIG. 7 is a schematic structural diagram of a limb of the present application.
Figure 8:
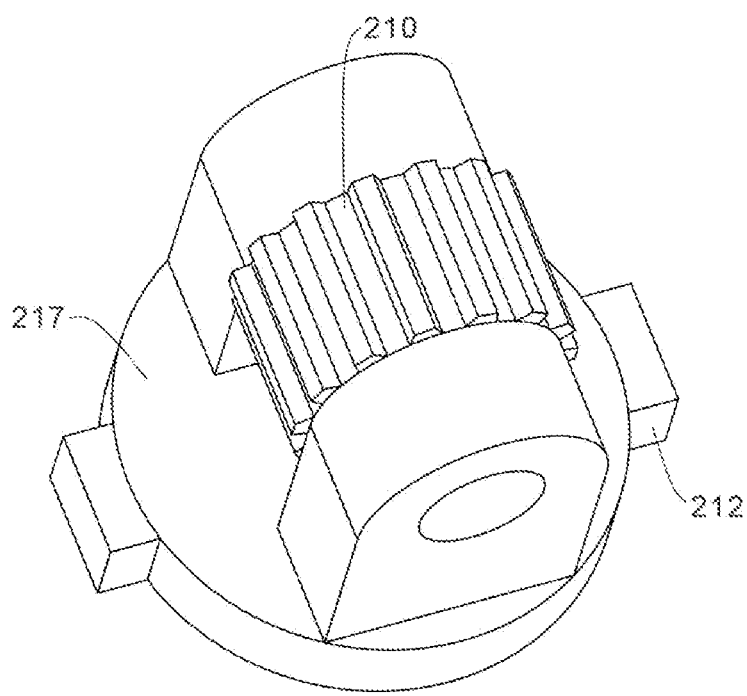
FIG. 8 is a schematic structural diagram of a second connection rod of the present application.
Figure 9:
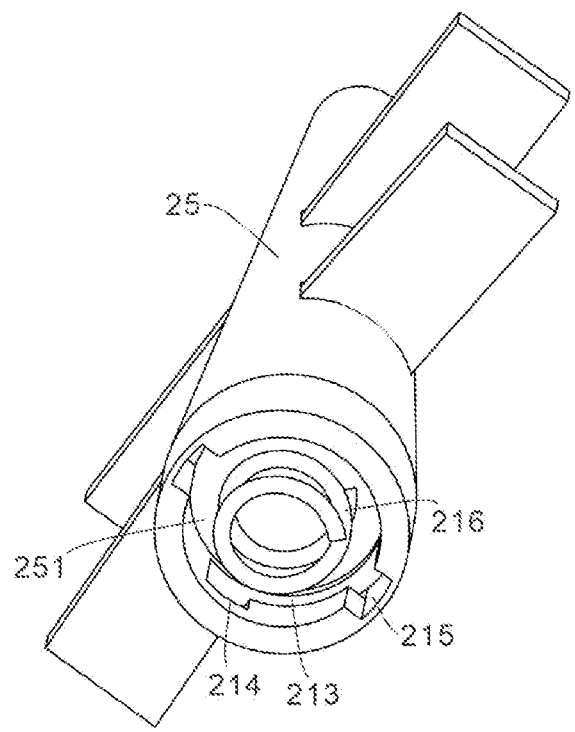
FIG. 9 is a schematic structural diagram of an elastic member of the present application.
Figure 10:
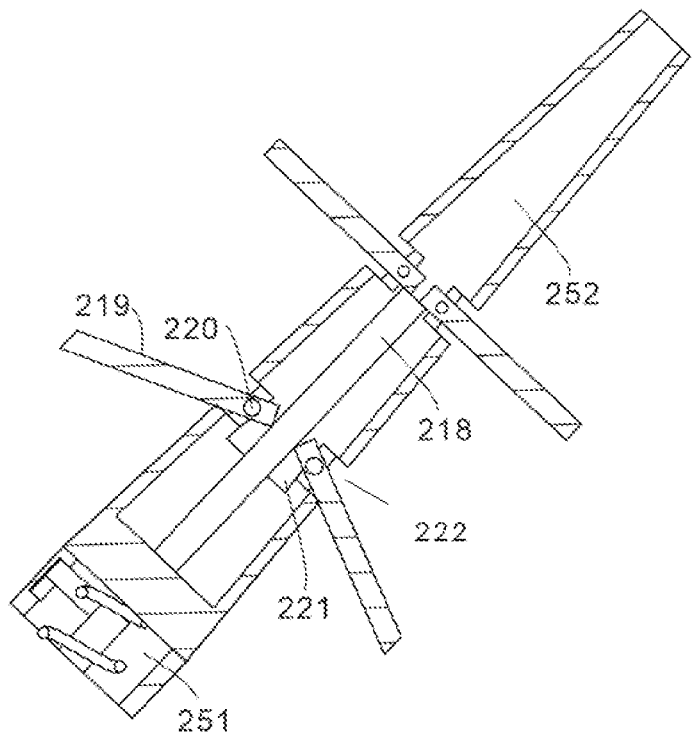
FIG. 10 is a schematic cross-sectional diagram of the limb of the present application.

In FIGS.: 1, a bearing base; 11, a supporting ring; 12, receiving slots; 13, first slots; 14, first connecting rods; 15, connecting blocks; 16, supporting legs; 17, supporting blocks; 2, a trunk; 21, a sleeve; 22, through holes; 23, first limiting rods; 24, a first electric telescopic rod; 25, limbs; 251, receiving space; 252, accommodating space; 26, connecting slots; 27, connecting openings; 28, rotating rods; 29, racks; 210, driven gears; 211, second connecting rods; 212, sliding blocks; 213, second slots; 214, third slots; 215, fourth slots; 216, elastic members; 217, protrusions; 218, second electric telescopic rods; 219, branches; 220, third connecting rods; 221, adjusting blocks; 222, connecting hole; 3, an intelligent control unit; 31, a power supply; 32, a light control assembly; 33, a master control assembly; 34, ambient lights; 35, a light-sensitive sensor.

DETAILED DESCRIPTION

The present application is further described with embodiments and drawings. The following embodiments are used to illustrate the present application and no limitations to the present application can be understood.

Please refer to FIGS. 1 to 10. The present application provides a Christmas tree with built-in intelligent light control circuit technological RGB lights, which includes a bearing base 1, a trunk 2, limbs 25 and an intelligent control unit 3. The bearing base 1 bears the trunk 2, the trunk 2 bears the limbs 25. The intelligent control unit 3 controls the on and off of ambient lights 34 installed on the artificial Christmas tree. In this embodiment, the bearing base 1 is placed on a horizontal plane, and the trunk 2 and the limbs 25 are located above the bearing base 1.

The bearing base 1 includes a supporting ring 11 which supports the trunk 2. A plurality of receiving slots 12 are provided on an outer sidewall of a top of the supporting ring 11 uniformly and vertically along a circumferential direction of the supporting ring 11. The receiving slots 12 pass through the supporting ring 11 from top to bottom. A supporting leg 16 is installed in each of the receiving slots 12. In an embodiment, a first connecting rod 14 is provided in each of the receiving slots 12 and hinged with the supporting leg 16. A plurality of first slots 13 are uniformly provided on an inner sidewall of the top of the supporting ring 11 along a circumferential direction of the supporting ring 11. The first slots 13 extend from top to bottom. Heights of the first slots 13 are shorter than a height of the supporting ring 11. The first slots 13 are used for limiting positions of first limiting rods 23 of the trunk 2.

The trunk 2 includes a sleeve 21, through holes 22, the first limiting rods 23 and a first electric telescopic rod 24. The sleeve 21 is a hollow structure. The sleeve 21 extends upwards from the bearing base 1, and a bottom of the sleeve 21 is inserted into the supporting ring 11. The first electric telescopic rod 24 is provided in the sleeve 21. A plurality of through holes 22 are provided on an outer wall of the sleeve 21 close to the supporting ring 11 horizontally along a radial direction of the sleeve 21. The through holes 22 are used for receiving and limiting positions to the first limiting rods 23. The first limiting rods 23 extend from an inside of the sleeve 21 to an outside of the sleeve 21. When the trunk 2 is installed on the bearing base 1, portions of the first limiting rods 23 outside of the sleeve 21 are stuck into the first slots 13 to limit a position of the sleeve 21. The first electric telescopic rod 24 is used for driving the limbs 25 to move and rotate. The first electric telescopic rod 24 extends in the sleeve 21 from bottom to top, and a bottom end of the first electric telescopic rod 24 close to the bearing base 1 is fixedly connected to a bottom of an inner wall of the sleeve 21. A plurality of the limbs 25 are provided around the sleeve 21 and extend to different directions from an outer sidewall of the sleeve 21 to support branches 219. Both ends of each of the limbs 25 are hollow structures, and inside of the limb 25 is provided with a receiving space 251 to receive a second connecting rod 211 and an accommodating space 252 to accommodate a second electric telescopic rod 218. The receiving space 251 is located at a side close to the sleeve 21. The branches 219 extend to different directions from outer sidewalls of the limbs 25 to stimulate a natural Christmas tree.

Figure 12:
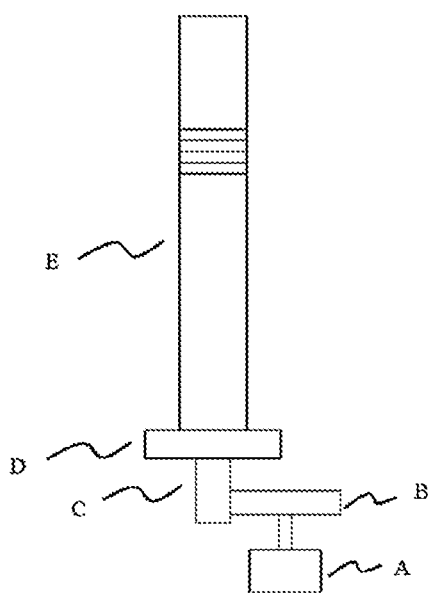
FIG. 12 is a schematic structural diagram of an electric telescopic rod of the present application.

In addition, the first electric telescopic rod 24 may be a telescopic equipment with a telescopic function in the prior art. For example, an electric telescopic rod shown in FIG. 12, includes a motor A, a gear B, a screw C, a turntable D and a rod body E. The motor A is coaxially connected to the gear B and drives the gear B to spin. The screw C coincides with an axis of the turntable D and the rod body E and meshes with the gear B. The turntable D is fixed on one axial end of the screw C. The rod body E is provided on one side of the turntable D away from the screw C and movably connected to the turntable D, the rod body E may move up and down with the turntable D without rotation. Racks are provided on the rod body E. In use, the motor A is fixedly connected to the bottom of the inner wall of the sleeve 21, the motor A drives the gear B to rotate, then the screw C rotates accordingly and moves up and down relative to the motor A, then drives the turntable D to move up and down, and the rod body E on the turntable D moves up and down accordingly.

Figure 11:
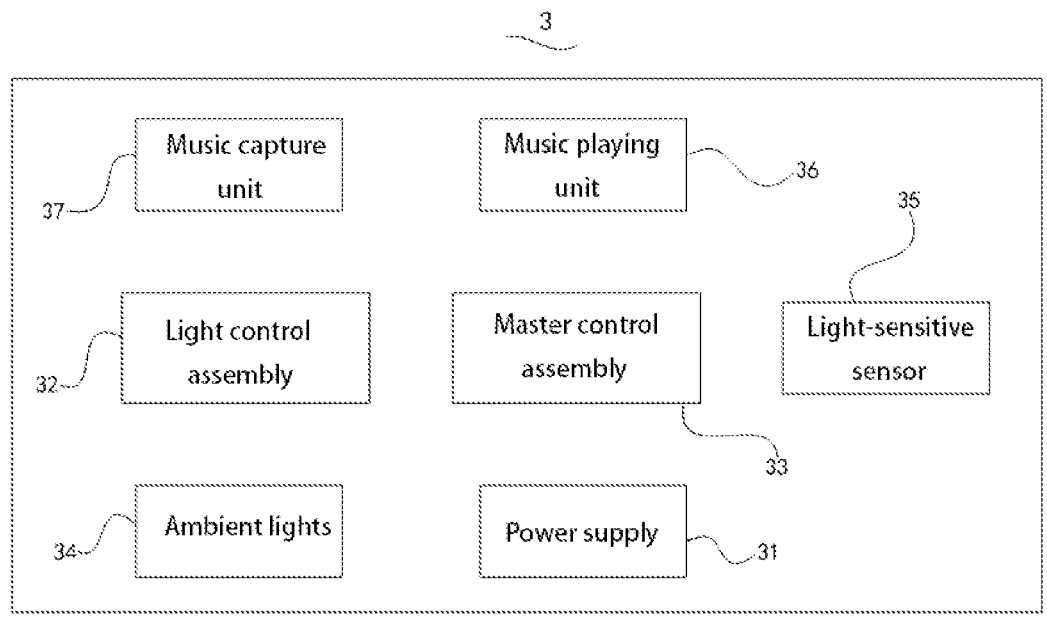
FIG. 11 is a schematic circuit diagram of an intelligent control unit of the present application.

Please refer to FIG. 11. The intelligent control unit 3 is used to control a brightness of the ambient lights 34. The intelligent control unit 3 includes a power supply 31 which forms a loop through electrical connection, a light control assembly 32, a master control assembly 33 and a plurality of ambient lights 34. The power supply 31 provides electricity to the ambient lights 34. The light control assembly 32 is electrically connected to the power supply 31 to control the brightness of the ambient lights 34. The master control assembly 33 is electrically connected to the light control assembly 32 to control the circuit on and off, and the ambient lights 34 are electrically connected to the power supply 31 and the master control assembly 33. The intelligent control unit 3 further includes a light-sensitive sensor 35 provided on a top of the sleeve 21. The light-sensitive sensor 35 is electrically connected to the light control assembly 32. In an embodiment, in addition to the ambient lights 34, the intelligent control unit 3 is disposed inside the sleeve 21.

The first connecting rod 14, a connecting block 15, the supporting leg 16 and a torsion spring are provided in each of the receiving slots 12. The first connecting rod 14 bears the connecting block 15. Both ends of the first connecting rod 14 are fixedly connected to a sidewall of the receiving slot 12. In this embodiment, an axial direction of the first connecting rod 14 is parallel to a horizontal plane. The connecting block 15 is hinged with the supporting ring 11 through the first connecting rod 14. The connecting block 15 may rotate around the first connecting rod 14 relative to the supporting ring 11. The connecting block 15 is fixed on the supporting leg 16 to support the trunk 2. A plurality of supporting blocks 17 are fixedly connected to a bottom of one end of the supporting leg 16 away from the supporting ring 11. When the Christmas tree is placed on a horizontal plane, bottom surfaces of the plurality of supporting blocks 17 are located in the same horizontal plane, so that the supporting legs 16 are located in one horizontal plane.

A plurality of connecting slots 26 and a plurality of connecting openings 27 are provided on the sleeve 21. The connecting openings 27 are provided on a sidewall of the sleeve 21, and are connected between the connecting slots 26 and an inner space of the sleeve 21. The connecting slots 26 communicate with the inner space of the sleeve 21 through the connecting openings 27. A rotating rod 28 is provided in each of the connecting slots 26, and the rotating rod 28 is inserted into the connecting slot 26. A driven gear 210 is sleeved outside the rotating rod 28, and the rotating rod 28 rotates along with the driven gear 210. In an embodiment, both ends of the rotating rod 28 are connected to the sleeve 21 through bearings. A plurality of racks 29 are fixedly connected to the first electric telescopic rod 24 to drive the driven gear 210 to rotate. The racks 29 are provided on an outer sidewall of the first electric telescopic rod 24 and mesh with the driven gear 210. In an embodiment, an axis of each rotating rod 28 is parallel to a horizontal plane. The racks 29 extend in an up-down direction, and teeth of the racks 29 are arranged side by side along the up-down direction. In addition, the driven gear 210 may be a helical gear, a bevel gear, etc.

In order to connect the trunk 2 and the limbs 25 together, second connecting rods 211 are provided on both sides of the driven gear 210. The two second connecting rods 211 are fixedly disposed on a bottom surface of a cylindrical protrusion 217. Sliding blocks 212 are fixedly connected to a circumferential sidewall of the protrusion 217 to limit positions of the second connecting rods 211. The protrusion 217 is arranged in the receiving space 251, circumferential sidewall of the protrusion 217 is in contact with inner wall of the receiving space 251. The bottom surface on which the two second connecting rods 211 are disposed faces an outside of the limb 25. In this embodiment, the number of the sliding blocks 212 on each protrusion 217 is two, and the sliding blocks 212 are projected along an axis of the limb 25. The sliding blocks 212 are disposed on circumferential sidewalls of protrusion 217 symmetrically. Accordingly, an inner wall of the receiving space 251 is provided with two second slots 213 and two third slot 214 that are communicated with each other to receive the sliding blocks 212 respectively. Each of the second slots 213 extends circumferentially in the receiving space 251. Each of the third slots 214 is communicated with the receiving space 251 and is located on one end of the second slot 213 in the extending direction thereof. Segment differences are provided between the second slot 213 and the third slot 214 along the axis of each limb 25, that is along the axis of each limb 25, the third slot 214 is closer to the outside of the limb 25, so that when the sliding blocks 212 slide into the third slots 214, the protrusion 217 may be fixed into the receiving space 251, and when the sliding blocks 212 slide into the second slots 213, the protrusion 217 may be rotated in the receiving space 251. In another embodiment, two fourth slots 215 are provided on the inner wall of the receiving space 251. Each of the fourth slots 215 is located on one end of the corresponding second slot 213 away from the third slot 214, and communicate the second slot 213 with outside of the receiving space 251. When the sliding blocks 212 slide into the fourth slots 215, the protrusion 217 may be pulled out from the receiving space 251. An elastic member 216 is provided in the receiving space 251 to limit positions of the sliding blocks 212. Elastic direction of the elastic member 216 is parallel with an extension direction of the limb 25. One end of the elastic member 216 is fixedly connected to the limb 25.

It should be noted that the elastic member 216 is preferably a spring or a damper.

A plurality of connecting holes 222 are provided on the limb 25. One end of the branch 219 is inserted into each of the connecting holes 222. The connecting holes 222 are communicated with the accommodating space 252. A second electric telescopic rod 218 is provided in the accommodating space 252 to rotate each of the branches 219. The second electric telescopic rod 218 extends along the accommodating space 252, one end of the second electric telescopic rod 218 is fixedly connected to an inner wall of the limb 25. One end of the branch 219 that is used to support the ambient lights 34 passes through the connecting hole and is connected to the second electric telescopic rod 218. Similar to the first electric telescopic rod 24, the second electric telescopic rod 218 may be a telescopic equipment with a telescopic function in the prior art. Repeating description is omitted here.

It should be noted that the ambient lights 34 are preferably RGB lights.

A third connecting rod 220 is provided running through the branch 219 to limit positions of the branch 219. The third connecting rod 220 is fixedly connected to the branch 219, both ends of the third connecting rod 220 are hinged with the limb 25 through bearings. A plurality of adjusting blocks 221 are protrudingly provided on an outer peripheral surface on the second electric telescopic rod 218 to adjust angles of the branches 219. One end of the branch 219 located in the limb 25 is in contact with the adjusting block 221 or end surface of the second electric telescopic rod 218.

Embodiment 1

Please refer to FIG. 1 and FIGS. 4 to 10. In this embodiment, when it is time to decorate the Christmas tree, first the first electric telescopic rod 24 is activated, so that the first electric telescopic rod 24 drives the racks 29 to move up. Accordingly, the driven gears 210 move down relative to the racks 29, and then the driven gears 210 are driven to rotate, so that the rotating rods 28 are driven to rotate and then the rotating rods 28 drive the limbs 25 to move down through the second connecting rods 211. It is convenient for people to decorate.

When the limbs 25 are lowered to a suitable height, the second electric telescopic rod 218 is activated to drive the adjusting blocks 221 to move in the accommodating space 252. During the moving of the adjusting blocks 221, the adjusting blocks 221 push the end of the branch 219, so that the branch 219 is driven to rotate with respect to the third connecting rod 220 as center of circle through the adjusting blocks 221, so that opening angles of the branch 219 may be adjusted. It is convenient for people to decorate.

When the decoration is finished, the first electric telescopic rod 24 is activated, then the first electric telescopic rod 24 drives the racks 29 to move down, so that the limb 25 is driven to move up. In this way, a beautiful appearance of the Christmas tree is ensured.

Embodiment 2

Please refer to FIGS. 2 to 7. In this embodiment, when it is necessary to assemble the Christmas tree with built-in intelligent light control circuit technological RGB lights, first the supporting legs 16 of the bearing base 1 are pulled apart, so that the supporting blocks 17 on the bottoms of the supporting legs 16 are in contact with the ground. The first limiting rods 23 of the sleeve 21 are put down along the first slots 13, so that the bearing base 1 may support the trunk 2. In this way, a quick installation of the bearing base 1 and the trunk 2 is completed.

The limb 25 is taken out, then the sliding blocks 212 are inserted into the receiving space 251 along the fourth slot 215. When the sliding blocks 212 are inserted into the second slots 213, the elastic member 216 is compressed by a force. The limb 25 is rotated to move the sliding blocks 212 along the second slots 213 to a connection of the second slots 213 and the third slots 214. At this time, the force on the elastic member 216 decreases. The sliding blocks 212 are pushed into the third slots 214, so that a quick installation of the limb 25 and the trunk 2 is completed.

When it is necessary to disassemble the Christmas tree with built-in intelligent light control circuit technological RGB lights, first the limb 25 is pushed towards the trunk 2, so that the sliding blocks 212 move to the connection of the third slots 214 and the second slots 213 from the third slots 214. The limb 25 is rotated, so that the sliding blocks 212 move to the connection of the third slots 213 and the fourth slots 215 along the second slots 213. At this time, the limb 25 is hold, then the sliding blocks 212 slide out of the receiving space 251 along the fourth slots 215 under the push of the elastic member 216, so that the second connecting rods 211 are driven to move out of the receiving space 251, and a quick disassembly of the limb 25 and the trunk 2 is completed.

When the limbs 25 are separated from the trunk 2, the trunk 2 is lifted, so that the first limiting rods 23 slide out of the supporting ring 11 along the first slots 13, and a quick disassembly of the trunk 2 and the bearing base 1 is completed. When the trunk 2 is separated from the bearing base 1, the supporting ring 11 is lifted, the supporting legs 16 are reset under actions of the torsion springs, and the supporting legs 16 return to an initial state.

Other structures are as same as Embodiment 1.

Embodiment 3

Please refer to FIG. 11. In this embodiment, an intensity of light indoors or outdoors is collected through the light-sensitive sensor 35 and transmitted to the master control assembly 33. When the light is relatively strong, the master control assembly 33 sends an enhancement instruction to the light control assembly 32, and the light control assembly 32 generates a corresponding enhancement signal to the ambient lights 34 according to the enhancement instruction, so that the ambient lights 34 are controlled to be brighter. When the light is relatively weak, the master control assembly 33 sends a weakening instruction to the light control assembly 32, and the light control assembly 32 generates a corresponding weakening signal to the ambient lights 34 according to the weakening instruction, so that the ambient lights 34 are controlled to be dimming and the Christmas tree is more prominent. It should be understood that the intensity of light indoors or outdoors is collected through the light-sensitive sensor 35 in real-time, therefore the master control assembly 33 sends an instruction to the light control assembly 32 in real-time to control the brightening or dimming of the ambient lights 34.

Furthermore, in some embodiments, the intelligent control unit 3 further includes a music playing unit 36 electrical connected to the master control assembly 33 and a music capture unit 37 electrical connected to the master control assembly 33. The music playing unit 36 is used for playing music, and the music capture unit 37 is used for capturing and analyzing a music played by the music playing unit 36 to obtain a rhythm degree of the music played by the music playing unit 36. The master control assembly 33 sends a rhythm instruction to the light control assembly 32 according to the rhythm degree, and the light control assembly 32 generates and sends a corresponding rhythm signal to the ambient lights 34 according to the rhythm instruction, and the ambient lights 34 shift according to the rhythm signal.

Particularly, the rhythm degree of the music includes quick rhythm and slow rhythm, the ambient lights 34 flash quickly following the quick rhythm and flash slowly following the slow rhythm. That is to say, the music playing unit 36 and the ambient lights 34 work to form music lights to decorate the Christmas tree.

Furthermore, the rhythm degree of the music is a loudness of sound. The ambient lights 34 are brighter as the sound is louder, and the ambient lights 34 are darker as the sound is smaller.

In addition, in some embodiments, the intelligent control unit 3 further includes a human body recognition unit electrically connected to the master control assembly 33 and a switching unit electrically connected to the master control assembly 33. The human body recognition unit is used to detect a presence of human within a preset distance range. The switching unit is used to control connections between the music playing unit 36 and the ambient lights 34. When the master control assembly 33 determines that the human body recognition unit detects a presence of a human within a preset distance range, the switching unit controls the music playing unit 36 to connect to the ambient lights 34, so that music may be played through the music playing unit 36 and the ambient lights 34 may be changed according to the rhythm degree of the music. When the master control assembly 33 determines that the human body recognition unit detects no presence of human within a preset distance range, the switching unit controls the music playing unit 36 not to connect to the ambient lights 34, so that the music playing unit 36 and the ambient lights 34 do not work. That is to say, the Christmas tree with built-in intelligent light control circuit technological RGB lights controls the music playing unit 36 and the ambient lights 34 to work when a presence of human is detected, and controls the music playing unit 36 and the ambient lights 34 not to work when no presence of human body is detected.

Furthermore, in some embodiments, the intelligent control unit 3 further includes a driving unit electrical connected to the master control assembly 33 to control the trunk 2 to rotate. When the driving unit detects the music played by the music playing unit 36 has a quick rhythm, the driving unit controls the trunk 2 to rotate quickly. When the driving unit detects the music played by the music playing unit 36 has a slow rhythm, the driving unit controls the trunk 2 to rotate slowly. It should be understood that the driving unit controls a rotation speed of the trunk 2 according to the rhythm degree of the music, and decorates the Christmas tree with the ambient lights 34 changed, which is more intelligent.

Other structures are as same as Embodiment 2.

The embodiments are for examples and detailed descriptions. The above-mentioned only express several implementation modes of the present application, and should not be understood as limiting the scope of the present application. It should be noted that, for those of ordinary skill in the art, several variations, modifications, substitutions, and variants may be made without departing from the concept of the present application.

What is claimed:

1. A Christmas tree with built-in intelligent light control circuit technological RGB lights, comprising, a bearing base that includes a supporting ring, wherein receiving slots are provided on a top of the supporting ring vertically, and a plurality of first slots are provided on the top of the supporting ring;

a trunk that includes a sleeve provided in the supporting ring, wherein the sleeve is a hollow structure, a plurality of through holes are provided on a lower part of an outer wall of the sleeve horizontally, a first limiting rod is provided in each of the through holes, one end of the first limiting rod extends out of the sleeve, a first electric telescopic rod is provided inside the sleeve, and a bottom end of the first electric telescopic rod is fixedly connected to a bottom of an inner wall of the sleeve;

a plurality of limbs provided around the sleeve, both ends of each of the limbs are hollow structures which are a receiving space and an accommodating space respectively; and an intelligent control unit that includes a power supply, a light control assembly electrically connected to the power supply, a master control assembly electrically connected to the light control assembly, and a plurality of ambient lights electrically connected to the power supply and the master control assembly;

wherein, the intelligent control unit further includes a music playing unit electrically connected to the master control assembly and a music capture unit electrically connected to the master control assembly, the music playing unit is used for playing music, and the music capture unit is used for capturing and analyzing a music played by the music playing unit to obtain a rhythm degree of the music played by the music playing unit, and the master control assembly sends a rhythm instruction to the light control assembly according to the rhythm degree, and the light control assembly generates and sends a corresponding rhythm signal to the ambient lights according to the rhythm instruction, and the ambient lights shift according to the rhythm signal.

2. The Christmas tree with built-in intelligent light control circuit technological RGB lights of claim 1, wherein, a first connecting rod is provided in each of the receiving slots, both ends of the first connecting rod are fixedly connected to the supporting ring, and a connecting block is connected to the first connecting rod.

3. The Christmas tree with built-in intelligent light control circuit technological RGB lights of claim 2, wherein, a supporting leg is fixedly connected to the connecting block, and a supporting block is fixedly connected to a bottom of one end of the supporting leg away from the supporting ring.

4. The Christmas tree with built-in intelligent light control circuit technological RGB lights of claim 1, wherein, a plurality of connecting slots and a plurality of connecting openings are provided on the sleeve, the connecting slots are communicated with an inner space of the sleeve through the connecting openings.

5. The Christmas tree with built-in intelligent light control circuit technological RGB lights of claim 4, wherein, a rotating rod is provided in each of the plurality of connecting slots, both ends of the rotating rod are connected to the sleeve, and a plurality of racks are fixedly connected to the first electric telescopic rod.

6. The Christmas tree with built-in intelligent light control circuit technological RGB lights of claim 5, wherein, a driven gear is fixedly connected to the rotating rod, the driven gear meshes with the racks, second connecting rods are provided on both sides of the driven gear, and sliding blocks are connected on both sides of the second connecting rods symmetrically.

7. The Christmas tree with built-in intelligent light control circuit technological RGB lights of claim 6, wherein, second slots, third slots and fourth slots are provided on an inner wall of the receiving space, an elastic member is provided inside the receiving space, the third slots are communicated with the fourth slots through the second slots, one end of the elastic member is fixedly connected to the limb, the sliding blocks are located in the third slots.

8. The Christmas tree with built-in intelligent light control circuit technological RGB lights of claim 1, wherein, a plurality of connecting holes are provided on each of the limbs, the connecting holes are communicated with the accommodating space, a second electric telescopic rod is provided in the accommodating space, one end of the second electric telescopic rod is connected to an inner wall of the limb, and a branch is provided in each of the plurality of connecting holes.

9. The Christmas tree with built-in intelligent light control circuit technological RGB lights of claim 8, wherein, a third connecting rod is provided running through the branch, the third connecting rod is fixedly connected to the branch, both ends of the third connecting rod are fixedly connected to the branch, and a plurality of adjusting blocks are provided on the second electric telescopic rod.

10. The Christmas tree with built-in intelligent light control circuit technological RGB lights of claim 1, wherein, the intelligent control unit further includes a light-sensitive sensor provided on a top of the sleeve, the light-sensitive sensor is electrically connected to the light control assembly;

wherein, the rhythm degree of the music includes quick rhythm and slow rhythm, the ambient lights flash quickly following the quick rhythm and flash slowly following the slow rhythm;

or, the rhythm degree of the music is a loudness of sound, the ambient lights are brighter when the sound is louder, and the ambient lights are darker when the sound is smaller.

\* \* \* \* \*